United States Patent
Park (10) Patent No.: US 7,798,460 B2
(45) Date of Patent: Sep. 21, 2010

(54) APPARATUS TO SUPPORT A DISPLAY DEVICE

(75) Inventor: Jue-ho Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 874 days.

(21) Appl. No.: 11/589,841

(22) Filed: Oct. 31, 2006

(65) Prior Publication Data

US 2008/0011927 A1 Jan. 17, 2008

(30) Foreign Application Priority Data

Nov. 12, 2005 (KR) ...................... 10-2005-0108310

(51) Int. Cl.
*A47H 1/10* (2006.01)
*H02B 1/01* (2006.01)

(52) U.S. Cl. ................. 248/324; 248/917; 248/920; 248/921; 248/922; 248/923; 248/317; 248/323; 361/825

(58) Field of Classification Search ............ 248/919, 248/917, 333, 317, 323, 324, 121, 122.1, 248/918, 922, 923, 343, 291.1, 247.1, 920, 248/921; 361/681, 825; 348/794, 836, 825; 345/905; 108/44, 152, 43, 115, 6, 25, 26, 108/45, 49; 224/930; 211/40

See application file for complete search history.

(56) References Cited

U.S. PATENT DOCUMENTS

2003/0141425 A1* 7/2003 Obdeijn .................. 248/317

| 2004/0084578 A1* | 5/2004 | Cho et al. ................ 248/125.1 |
| 2004/0135050 A1* | 7/2004 | Lee et al. ..................... 248/317 |
| 2004/0149873 A1* | 8/2004 | Ishizaki et al. ........... 248/274.1 |
| 2004/0155167 A1 | 8/2004 | Carter |
| 2005/0092890 A1 | 5/2005 | Liao |

(Continued)

FOREIGN PATENT DOCUMENTS

CN 1527326 9/2004

(Continued)

OTHER PUBLICATIONS

Chinese Office Action issued Mar. 13, 2009 in CN Application No. 2006100641097.

(Continued)

*Primary Examiner*—J. Allen Shriver, II
*Assistant Examiner*—Christopher Garft
(74) *Attorney, Agent, or Firm*—Stanzione & Kim, LLP (57) ABSTRACT

An apparatus to support a display device main body to a ceiling includes a ceiling bracket connectable with the ceiling; a connecting bracket having a swivel hinge coupled with the ceiling bracket to enable the connecting bracket to swivel in a direction perpendicular to a plane of the ceiling bracket; and a supporting bracket to elastically support the display device main body to overcome a weight of the display device main body, the supporting bracket having a tilting hinge combined tiltably with the connecting bracket. Thus, an apparatus to support a display device in which swivel, pivot and tilt movements of the display device main body supported to a ceiling can be performed conveniently and the display device main body can be tilted by a relatively small force is provided.

35 Claims, 6 Drawing Sheets

U.S. PATENT DOCUMENTS

| | | | |
|---|---|---|---|
| 2005/0236542 A1 | 10/2005 | O'Neill | |
| 2005/0236543 A1* | 10/2005 | O'Neil | 248/286.1 |
| 2006/0065800 A1* | 3/2006 | Bremmon | 248/274.1 |
| 2007/0221807 A1* | 9/2007 | Park | 248/324 |
| 2008/0128574 A1* | 6/2008 | Walters et al. | 248/324 |

FOREIGN PATENT DOCUMENTS

| | | |
|---|---|---|
| CN | 2704905 | 6/2005 |
| DE | 19532778 | 3/1997 |
| DE | 202004018366 | 3/2005 |
| JP | 2001-146874 | 5/2001 |
| JP | 2004-053708 | 2/2004 |
| KR | 1999-70072 | 9/1999 |
| KR | 2005-38088 | 4/2005 |

OTHER PUBLICATIONS

European Search Report dated Feb. 25, 2008 issued in EP 06076962.
Chinese Office Action issued Mar. 1, 2010 in CN Application No. 200610064109.7.

* cited by examiner

APPARATUS TO SUPPORT A DISPLAY DEVICE

CROSS-REFERENCE TO RELATED APPLICATIONS

This application claims priority from Korean Patent Application No. 2005-0108310, filed on Nov. 12, 2005, in the Korean Intellectual Property Office, the disclosure of which is incorporated herein by reference in its entirety.

BACKGROUND OF THE INVENTION

1. Field of the Invention

The present general inventive concept relates to an apparatus to support a display device, and more particularly, to an apparatus having an improved structure to support a display device to be installed to a ceiling.

2. Description of the Related Art

In general, the display device such as a television display unit or a computer monitor generates an image and can be mounted to a horizontal plane, such as a table, or an inclined plane, such as a wall, through a predetermined supporting apparatus.

Recently, the display devices are provided with a display main body employing a flat display panel, such as a liquid crystal display (LCD) and a plasma display panel (PDP), so that a screen of a large size is easily obtained and a space required for installing the display device can be reduced due to its relatively thin thickness. Also, the display device can be installed onto various places such as a ceiling, an inclined surface, a wall surface, etc.

An apparatus for securing the display device is disclosed in Korean First Publication No. 10-2005-0038088 published on Apr. 27, 2005. This conventional securing apparatus comprises a ceiling bracket secured to a ceiling, a connecting bracket or two connection brackets extended by being connected to each other to adjust its height, and combined with the ceiling bracket, and an angle adjusting bracket combined with the connecting bracket and rotated in the horizontal direction while generating a predetermined friction force. Also, the conventional securing apparatus comprises a supporting bracket passing through and inserted in the angle adjusting bracket and rotated in the vertical direction while generating a predetermined friction force, and standing brackets provided at both ends of the supporting bracket and combined with a rear surface of the display device.

According to the conventional securing apparatus having the above structures, the display device can be controlled to rotate in the horizontal direction and the vertical direction by using the friction member provided in the angle adjusting bracket. Also, a supporting width can be adjusted according to the size of the display device by using the supporting bracket.

However, the conventional securing device has no function to pivotally rotate the display device, which does not meet the recent various presentation needs, and thus causes inconveniences in use. Also, in view of the recent trend in which the size of the display device is becoming larger, the weight of the display device is being increased, and thus there is a problem that a relatively large force should be applied when adjusting a view angle of the display device.

SUMMARY OF THE INVENTION

The present general inventive concept provides an apparatus to support a display device in which swivel, pivot and tilt movements of the display device main body supported at a ceiling can be performed conveniently and the display device main body can be tilted by a relatively small force.

Additional aspects and advantages of the present general inventive concept will be set forth in part in the description which follows and, in part, will be obvious from the description, or may be learned by practice of the general inventive concept.

The foregoing and/or other aspects and utilities of the present general inventive concept can be achieved by providing an apparatus to support a display device main body to a ceiling, comprising: a ceiling bracket to be combined with the ceiling; a connecting bracket having a swivel hinge to be coupled with the ceiling bracket to enable the connecting bracket to swivel in a direction perpendicular to a plane of the ceiling bracket; and a supporting bracket to elastically support the display device main body to overcome the weight of the display device main body, the supporting bracket having a tilting hinge combined tiltably with the connecting bracket.

The connecting bracket may further comprise a pivot hinge to enable the connecting bracket to pivot in a direction perpendicular to an axis of the swivel hinge.

The connecting bracket may comprise a connecting bracket main body having a first connecting bracket main body and a second connecting bracket main body to face each other to be coupled with the swivel hinge and the pivot hinge, and the supporting bracket may comprise at least one supporting bracket main body coupled with a tilting hinge of the connecting bracket to support the display device main body.

The swivel hinge may comprise a swivel hinge shaft having a first side to be combined with the ceiling bracket and a second side to be combined with the connecting bracket main body; and a swivel hinge shaft hole which is provided through the supporting bracket main body to be combined with the swivel hinge shaft.

The swivel hinge may comprise a swivel hinge engaging section formed to protrude from one of the swivel hinge shaft and the swivel hinge shaft hole; and a swivel hinge engaged section formed on the other of the swivel hinge shaft and the swivel hinge shaft hole to be engaged with the swivel hinge engaging section.

The connecting bracket main body may have a pivot angle restriction unit provided to restrict a pivot movement of the pivot hinge within a predetermined range of angle when the pivot hinge is pivoted in the direction perpendicular to the swivel axis of the swivel hinge.

The pivot angle restriction unit may comprise an angle adjusting pin receiving section formed to be depressed from a plate surface of the pivot hinge, and an angle adjusting pin to be combined with the connecting bracket main body and to be engaged with the angle adjusting pin receiving section.

The pivot angle restriction unit may further comprise an angle adjusting elastic member to be combined with the angle adjusting pin so as to elastically press the angle adjusting pin toward the angle adjusting pin receiving section, and an angle adjusting elastic member stopper to be combined with the angle adjusting pin for preventing the angle adjusting elastic member from separating from the angle adjusting pin.

The pivot hinge may comprise a pivot unit to be combined with the connecting bracket main body so as to enable the tilting hinge to pivot in the direction perpendicular to a plane of the connecting bracket main body, and a pivot clamp to be combined with the pivot unit through a first side thereof and combined with the tilting hinge through a second side thereof.

The pivot unit may comprise a pivot engaging section having a pivot plate on which a pivot surface is formed, the pivot surface being slidably contacted with the second connecting bracket main body; and a pivot engaged section provided on the connecting bracket main body and to be engaged with the pivot engaging section.

The pivot engaging section may comprise a pivot guider having a cylindrical shape and extending from a plate surface of the pivot plate toward an inside of the connecting bracket main body, and a pivot clamp receiving section to be combined with the pivot clamp and formed to be depressed from a plate surface which is disposed opposite to the pivot guider.

The pivot engaged section may comprise a pivot hinge hole formed through the second connecting bracket main body and to be engaged with a pivot surface of the pivot plate, and a pivot guider formed to protrude from a plate surface of the first connecting bracket main body, the pivot guider to guide the pivot guide section to allow the pivot hinge to pivot.

The pivot clamp may comprise a tilting hinge receiving section formed to receive the tilting hinge, a tilting hinge fixing hole to be combined with fixing means to fix the tilting hinge received in the tilting hinge receiving section, and a pivot clamp combining section provided at the first side of the pivot clamp and to be combined with the second connecting bracket main body.

The tilting hinge may comprise a tilting hinge shaft to be combined with the pivot hinge to act as an axis of a tilt movement of the display device main body, and a first tilt hinge shaft hole formed through the supporting bracket main body and to be combined with the tilting hinge shaft.

The supporting bracket main body may comprise a main body fixing slot formed thereon to support the display device main body, the main body fixing slot to comprise a lower section and an upper section having a sectional surface area which is larger than that of the lower section.

The supporting bracket main body may comprise a first supporting bracket formed to receive the tilting hinge in a mid portion thereof, a plurality of second supporting brackets disposed at both sides of the first supporting bracket and to be combined with each other, and a supporting bracket housing to receive the first supporting bracket and the second supporting brackets therein, the first and second supporting brackets are to be combined with each other in the supporting bracket housing.

A friction receiving section may be formed to from one of the first supporting bracket and the second supporting brackets; and a friction protrusion may be formed to the other one of the first supporting bracket and the second supporting brackets and to be engaged slidably with the friction receiving section.

The apparatus to support the display device may further comprise an elastic unit to be combined with the first supporting bracket to support elastically the second supporting bracket to support the weight of the display device main body when the support bracket is tilted against the connecting bracket, wherein the elastic unit may comprise an elastic member having elasticity, an elastic member main body to be combined with the elastic member, an elastic member rotating shaft formed to protrude from a plate surface of the elastic member main body and to be combined with the first support bracket to enable the elastic member main body to rotate around the first supporting bracket, and an elastic member stopper provided between the elastic member rotating shaft and the elastic member and combined with the elastic member main body to support the elastic member.

The second supporting bracket may comprise an inclined section formed thereon, a distance between an axis of the pivot movement of the tilting hinge and the inclined section being increased gradually such that the elastic member is compressed and expanded when the second supporting bracket is rotated around the first supporting bracket.

The first supporting bracket may comprise a tilt angle restriction slot formed thereon to receive the elastic member main body to restrict a movement of the elastic member main body within a predetermined range of angle.

The angle restriction slot may comprise an elastic member rotating shaft hole to be combined with the elastic member rotating shaft.

The first supporting bracket may comprise a tilting hinge fixing hole formed for fixing the tilting hinge.

The second supporting brackets may comprise a second supporting bracket combining hole formed to combine the second supporting brackets with each other, and a second supporting bracket combining member to be combined with the second supporting bracket combining hole.

The apparatus to support the display device may further comprise a supporting bracket receiving section formed to receive the first and second supporting brackets in the supporting bracket housing therethrough.

The apparatus to support the display device may further comprise an elastic member stopper protrusion formed to protrude from one of the elastic member stopper and the inclined section to prevent the elastic member stopper from separating from the inclined section, and an elastic member stopper receiving section formed on the other one of the elastic member stopper and the inclined section and to be engaged with the elastic member stopper protrusion.

The foregoing and/or other aspects and utilities of the present general inventive concept can be achieved by providing an apparatus to support a display device to a ceiling, comprising: a ceiling bracket connectable to the ceiling; a swivel hinge connected at one end to a center portion of the ceiling bracket; a connecting bracket comprising: a swivel hinge engaging section at one side thereof to engage with the other end of the swivel hinge to swivel about an axis of the swivel hinge, and a pivot hinge at another side thereof to pivot about an axis extending perpendicular to the axis of the swivel hinge; a tilting hinge shaft extending through the pivot hinge to pivot together with the pivot hinge about an axis perpendicular to the swivel hinge; and a tilting hinge tiltably disposed at each end of the tilting hinge shaft to engage with a respective end of the display device to tilt the display device about an axis of the tilt hinge shaft.

The pivot hinge may comprise a first connecting bracket main body to engage with a portion of the swivel hinge shaft and comprising a pivoting engaging section extending therethrough to slidably support the pivot hinge and a second connecting bracket main body to face the first connecting bracket main body and to be secured thereto and to engage with a remaining portion of the swivel hinge shaft, the second connecting bracket main body comprising a pivot guide to extend inward through the connecting bracket toward the first connecting bracket main body to support an inner portion of the pivot hinge in the pivot hinge engaging section.

The pivot hinge may comprise a pivot hinge plate to be secured between the pivoting engaging section and the pivot guide and a pivot hinge clamp in which the tilting hinge shaft extends therethrough and to engage with an outer portion of the pivot hinge plate.

Each tilting hinge may comprise a first supporting bracket to engage with the respective end of the tilting hinge shaft, and a pair of second supporting brackets, the supporting brackets disposed on opposite sides of the first supporting bracket and connected to each other such that the pair of second supporting brackets frictional rotate with respect to the first supporting bracket, and a supporting bracket housing to connect with the pair of second supporting brackets and to connect with the display unit to proving a frictional movement of the display device with respect to the tilting hinge shaft.

The first supporting bracket may have a friction receiving section formed therein to receive a screw member which extends therethrough to engage with the tilting hinge shaft to fix the first supporting bracket with respect to the tilting hinge shaft.

One of the first supporting bracket and the second support brackets may comprise a friction receiving section and the other one of the first supporting bracket and the second support brackets may comprise at least one friction protrusion such that the friction protrusion section engages within the friction receiving section to frictionally slide therein.

The friction receiving section may be formed to a predetermined length to limit the sliding contact of the first supporting bracket and the second support brackets.

The foregoing and/or other aspects and utilities of the present general inventive concept can be achieved by providing an apparatus to support a display device to a ceiling, comprising a ceiling bracket connectable to the ceiling, a first swivel unit extending from the ceiling bracket and comprising: a first rotation member rotatable about an axis extending away from the ceiling and a second rotation member rotatable about an axis perpendicular to the first rotation axis; a display unit fixing member to fix the display unit to the second rotation axis to rotate the display unit about the first rotation axis and the second rotation axis.

The display unit fixing member may comprise a shaft extending through the second rotation member and a support bracket disposed at each end of the shaft at a middle portion thereof to frictionally rotate with respect to the shaft and connectable to the display unit such that the display unit frictionally rotates with respect to the shaft about an axis perpendicular to the axis in which the first and second rotating members rotate.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

The apparatus to support the display device according to the embodiments of the present general inventive concept is applicable to the various types of display devices which form images. In this specification, by way of example, the apparatus to support the display device to fix a flat display device' such as an LCD television' to a ceiling is described.

Figure 1:
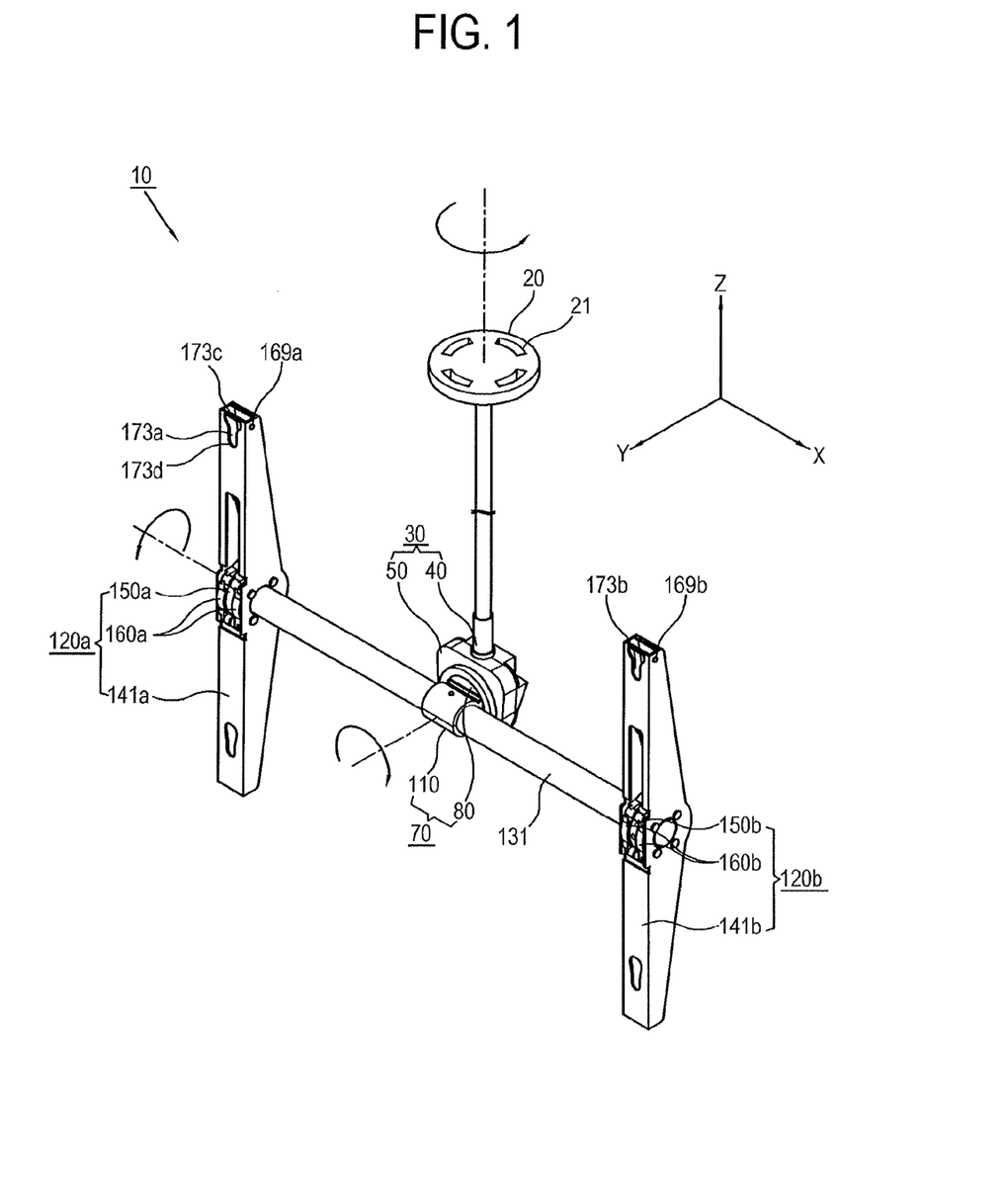
FIG. 1 is a perspective view of an apparatus to support a display device according to the present general inventive concept.
Figure 2:
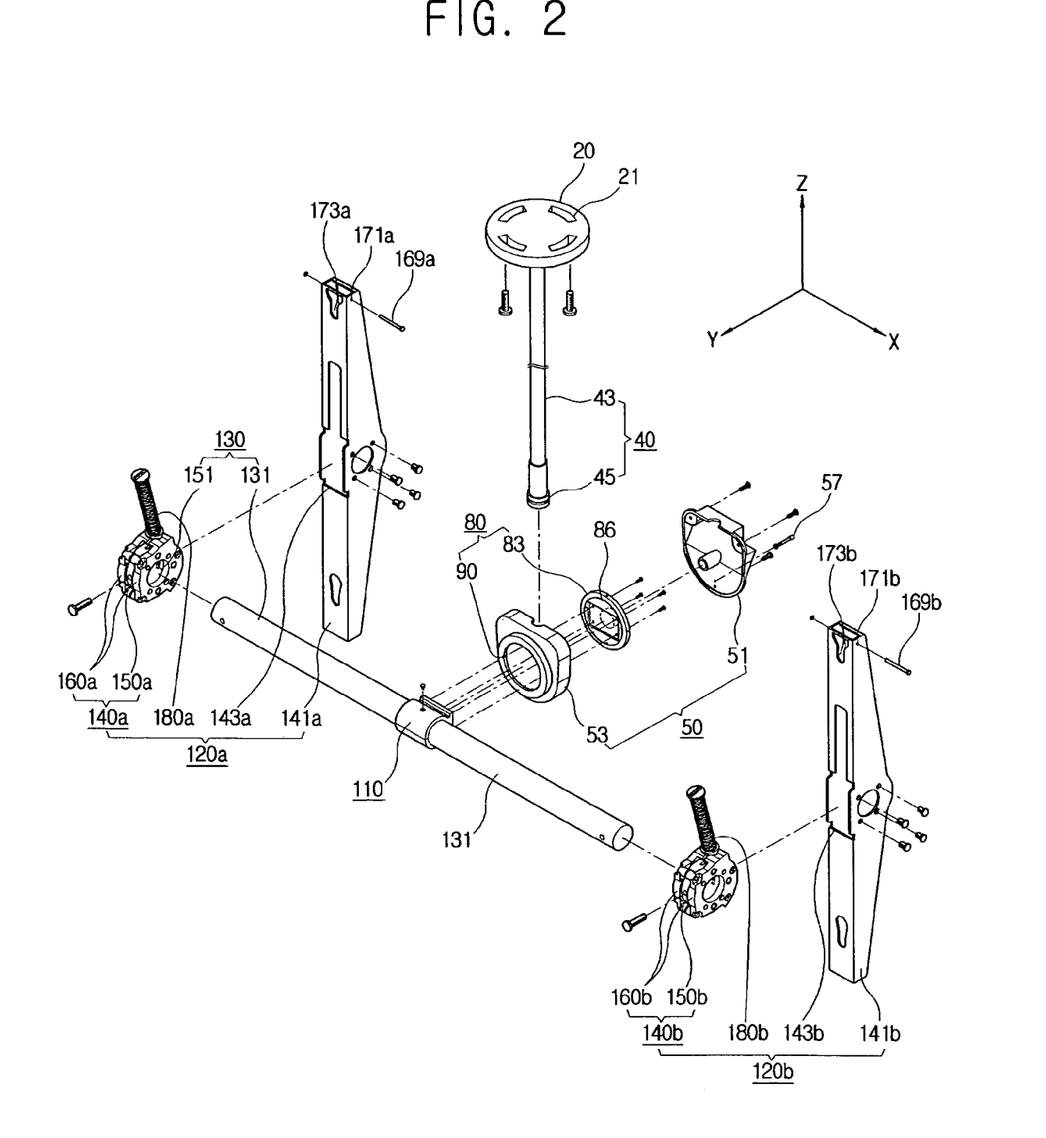
FIG. 2 is an exploded perspective view of the apparatus to support the display device of FIG. 1.

As illustrated in FIG. 1 and FIG. 2, an apparatus 10 to support a display device can comprise a ceiling bracket 20 connectable to a ceiling; a swivel hinge 40 connectable to the ceiling bracket 20 to swivel in a direction perpendicular to a plane of the ceiling bracket 20; a connecting bracket 30 having a pivot hinge 70 to enable the connecting bracket 30 to pivotally rotate in a direction perpendicular to the swiveling axis of the swivel hinge 40; and a supporting bracket 120a, 120b to support a display device main body 15 (refer to FIG. 5) and having a tilting hinge 130 to act together with the connecting bracket 30 to enable the display device main body to tilt.

Figure 5:
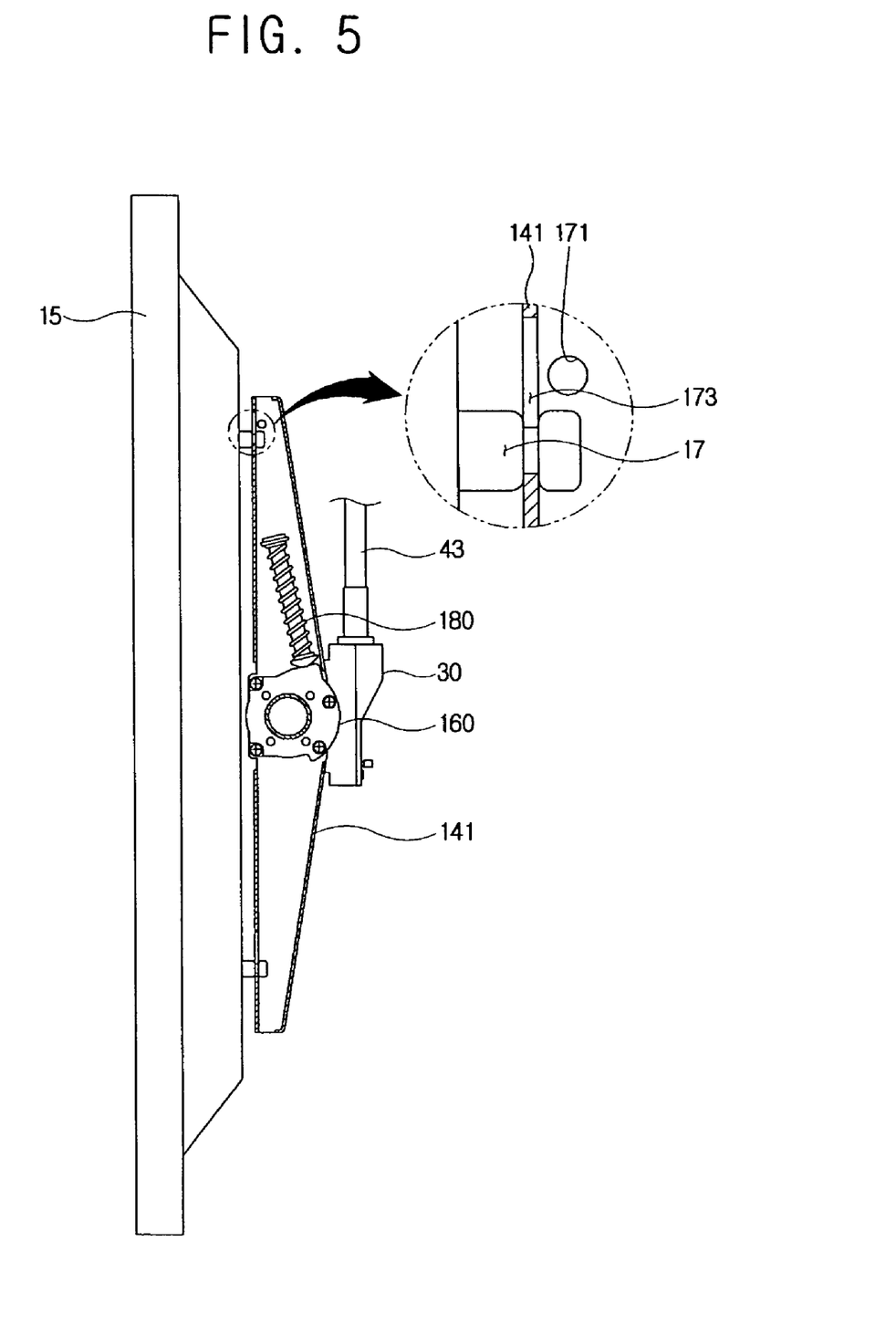
FIG. 5 and FIG. 6 are cross sectional views illustrating a tilting process of a tilting hinge of the apparatus to support the display device of FIG. 1.

As illustrated in FIG. 5, the display device main body 15 has a main body fixing protrusion 17 insertable in a main body fixing slot 173 (173a, 173b as illustrated in FIG. 1, wherein 173c represents an upper section of the main body fixing slot and 173d represents a lower section of the main body fixing slot) of the supporting bracket 120 which will be described below.

As illustrated in FIG. 2, the ceiling bracket 20 combines with the swivel hinge 40 and can have a plurality of ceiling fixing slots 21 formed therein to fix the apparatus 10 to support the display device at the ceiling. The ceiling bracket 20 can have a form of a circular plate shape to have a strength sufficient to withstand the weight of the display device main body 15 and an impact caused by its movement. The ceiling bracket 20 can be modified to have a polygonal shape, such as a hexagon as needed. Also, the ceiling bracket 20 can be formed integrally with a swivel hinge shaft 43.

As illustrated in FIG. 2, the ceiling fixing slots 21 can be formed through the ceiling bracket 20 so that a fixing means, such as a screw, may be passed through the ceiling fixing slots 21 and fixed to the ceiling to fix the apparatus 10 to support the display device to the ceiling.

As illustrated in FIG. 1, the connecting bracket 30 has the swivel hinge 40 to be combined with the ceiling bracket 20 to swivel around an axial direction Z ("Z"-axial direction in FIG. 1 and FIG. 2) perpendicular to a plane of the ceiling bracket 20; and a pivot hinge 70 to pivotally rotate around an axial direction Y ("Y"-axial direction in FIG. 1 and FIG. 2) perpendicular to a swiveling axis of the swivel hinge 40. Accordingly, the connecting bracket 30 combines with the swivel hinge 40 to swivel in the direction perpendicular to the plane of the ceiling bracket 20 and combines with the pivot hinge 70 to pivotally rotate in the direction perpendicular to the swiveling axis of the swivel hinge 40, so that a user can easily adjust a view angle of the display device main body 15.

Figure 3:
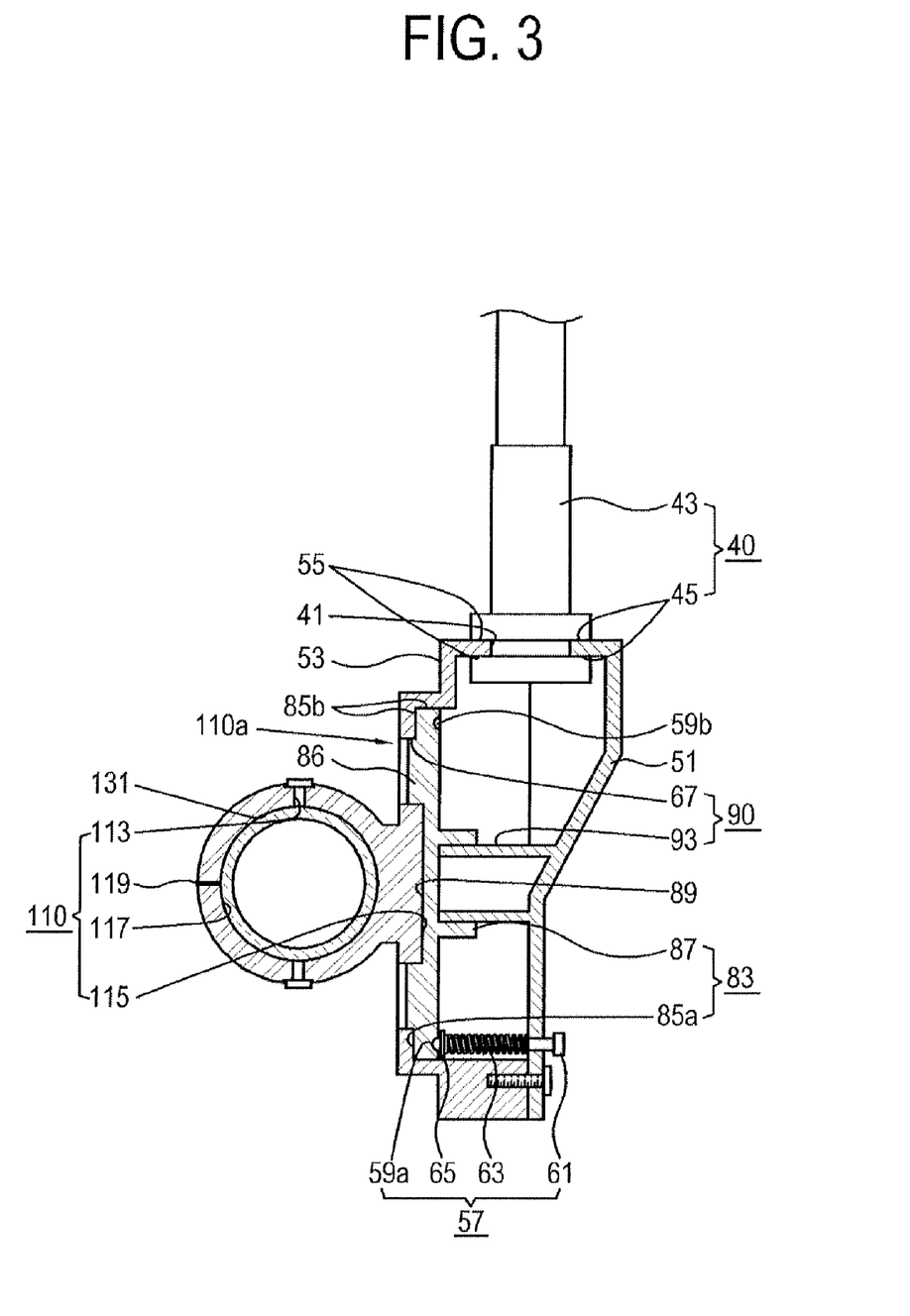
FIG. 3 is a combined sectional view of a connecting bracket used with the apparatus to support the display device of FIG. 1.

As illustrated in FIG. 2 and FIG. 3, the swivel hinge 40 is connectable with the ceiling bracket 20 to enable the connecting bracket 30 to swivel in the direction perpendicular to the plane of the ceiling bracket 20. Also, the swivel hinge 40 is provided with a swivel hinge shaft 43 having a first end connectable with the ceiling bracket 20 and a second end connectable with a connecting bracket main body 50; and a swivel hinge shaft hole 41 provided on the connecting bracket main body 50 to combine with the swivel hinge shaft 43. Also, the swivel hinge 40 may comprise a swivel hinge engaging section 45 formed on one of the swivel hinge shaft 43 and the swivel hinge shaft hole 41, and a swivel hinge engaged section 55 to engage with the swivel hinge engaging section 45 and formed on the other one of the swivel hinge shaft 43 and the swivel hinge shaft hole 41. Accordingly, the connecting bracket 30 can be swiveled in an axial direction perpendicular to the plane of the ceiling bracket 20 by the swivel hinge 40.

As illustrated in FIG. 2, the swivel hinge shaft hole 41 is formed through the connecting bracket main body 50 to receive the swivel hinge shaft 43.

As illustrated in FIG. 2, a first end of the swivel hinge shaft 43 combines with the ceiling bracket 20, and a second end thereof combines with the swivel hinge shaft hole 41 of the connecting bracket main body 50. Also, the swivel hinge shaft 43 has a predetermined length to have strength sufficient to stably support the display device main body 15.

As illustrated in FIG. 2 and FIG. 3, the swivel hinge engaging section 45 protrudes around the swivel hinge shaft 43 so that the connecting bracket 30 can swivel about the axis perpendicular to the plane of the ceiling bracket 20. Also, the swivel hinge engaging section 45 engages with the swivel hinge engaged section 55, which will be described later, and can be formed to protrude around the swivel hinge shaft hole 41.

As illustrated in FIG. 1, FIG. 2 and FIG. 3, the connecting bracket main body 50 has a first connecting bracket main body 51 and a second connecting bracket main body 53, which are disposed to face each other such that the first and second connecting bracket main bodies 51 and 53, respectively, can be combined with the swivel hinge 40 and the pivot hinge 70. Alternatively, the first connecting bracket main body 51 can be formed integrally with the second connecting bracket main body 53. Also, the connecting bracket main body 50 has a pivot angle restriction unit 57 provided to restrict the pivot hinge 70 to pivotally rotate within a predetermined range of angle while the pivot hinge 70 pivotally rotates about the axial direction perpendicular to the swiveling axis of the swivel hinge 40.

As illustrated in FIG. 2 and FIG. 3, the first connecting bracket main body 51 is disposed opposite to the second connecting bracket main body 53 such that the first and second connecting bracket main bodies 51 and 53, respectively, can combine with the swivel hinge 40 and the pivot hinge 70. Also, the first connecting bracket main body 51 forms a part of the swivel hinge engaged section 55 to engage with the swivel hinge engaging section 45 of the swivel hinge shaft 43. An angle adjusting pin 61 of the pivot angle restriction unit 57 couples to the first connecting bracket main body 51, and a pivot guide 93 of a pivoting engaging section 90, which will be described below, is formed to protrude from a plate surface of the pivoting engaging second 90 toward an inside of the connecting bracket main body 50.

As illustrated in FIG. 2 and FIG. 3, the second connecting bracket main body 53 is disposed opposite to the first connecting bracket main body 51 such that the first and second connecting bracket main bodies 51 and 53, respectively, can combine with the swivel hinge 40 and the pivot hinge 70. Also, the second connecting bracket main body 53 forms a part of the swivel hinge engaged section 55 to be engaged with the swivel hinge engaging section 45 of the swivel hinge shaft 43. Also, an angle adjusting pin receiving section 59a and 59b of the pivot angle restriction unit 57 connects with the second connecting bracket main body 53, and a pivot hinge hole 67 to be engaged with a pivot engaging section 83 is formed on the second connecting bracket main body 53.

The second connecting bracket main body 53 is disposed opposite to the first connecting bracket main body 51 such that the first and second connecting bracket main bodies 51 and 53, respectively, can combine with the swivel hinge 40, the pivot hinge 70 and the pivot angle restriction unit 57.

As illustrated in FIG. 3, the swivel hinge engaged section 55 is formed on the connecting bracket main body 50 such that the connecting bracket 30 can be swiveled about the axial direction perpendicular to a plane of the ceiling bracket 20. Also, the swivel hinge engaged section 55 engages with the swivel hinge engaging section 45 and may be formed at the swivel hinge shaft hole 41.

Accordingly, the swivel hinge engaged section 55 combines with the swivel hinge engaging section 45 to swivel the connecting bracket main body 50 about the axial direction perpendicular to the plane of the ceiling bracket 20.

As illustrated in FIG. 3, the pivot angle restriction unit 57 is provided on the connecting bracket main body 50 to restrict a pivot movement of the pivot hinge 70 within a predetermined range of angle while the pivot hinge 70 is pivotally rotated in the direction perpendicular to the swiveling axis of the swivel hinge 40. Also, the pivot angle restriction unit 57 has angle adjusting pin receiving sections 59a and 59b formed to be depressed from a plate surface of a pivot plate 86 of the pivot hinge 70, and the angle adjusting pin 61 combines with the first connecting bracket main body 51 to be engaged with the angle adjusting pin receiving sections 59a and 59b. Also, the pivot angle restriction unit 57 has an angle adjusting elastic member 63 combinable with the angle adjusting pin 61 to elastically press the angle adjusting pin 61 toward the angle adjusting pin receiving sections 59a and 59b, and an angle adjusting elastic member stopper 65 combines with the angle adjusting pin 61 to prevent the angle adjusting elastic member 63 from separating from the angle adjusting pin 61. Therefore, while the pivot hinge 70 is operating, it is possible to prevent the pivot hinge 70 from pivoting out of a predetermined range of angle, so that the display device main body 15 can be maintained stably when it is pivotally rotated.

As illustrated in FIG. 3, the angle adjusting pin receiving sections 59a and 59b can be formed radially from the pivot plate 86 of the pivot hinge 70 to be depressed from the surface of the pivot plate 86 so that the angle adjusting pin receiving sections 59a and 59b may be engaged with an end portion of the angle adjusting pin 61. In this embodiment of the present general inventive concept, four (4) angle adjusting pin receiving sections 59a and 59b are formed on a first imaginary line corresponding to an axial line of the swivel movement and a second imaginary line perpendicular to the first imaginary line at intervals of 90°. The angle between two adjacent adjusting pin receiving sections 59a and 59b can be changed as needed. For example, eight (8) adjusting pin receiving sections 59a and 59b can be formed at intervals of 45°. Accordingly, due to the angle adjusting pin receiving sections 59a and 59b engaged with the angle adjusting pins 61, the pivot angle can be maintained stably after the display device main body 15 is pivoted at a predetermined angle.

As illustrated in FIG. 3, the angle adjusting pin 61 combines with the first connecting bracket main body 51 to be engaged with the adjusting pin receiving section 59a. Also, the angle adjusting pin 61 combines with the angle adjusting elastic member 63 and has the angle adjusting elastic member stopper 65 combined with one side of the angle adjusting pin 61 to prevent the angle adjusting elastic member 63 from separating from the angle adjusting pin 61. Also, the angle adjusting pin 61 may be provided with a handle (not illustrated) formed at an end portion thereof and exposed to the outside to separate easily the angle adjusting pin 61 from the adjusting pin receiving section 59a when the display device is pivoted.

As illustrated in FIG. 3, the angle adjusting elastic member 63 combines with the angle adjusting pin 61 to supply an elastic force to the angle adjusting pin 61, so that the angle adjusting pin 61 is elastically pressed toward the adjusting pin receiving section 59a. Due to such structure, the angle adjusting pin 61 engages with the adjusting pin receiving section 59a to maintain stably a predetermined pivot angle. Also, if the user grasps the handle of the angle adjusting pin 61 when the display device is pivoted, it is possible to release easily the pivot state of the display device. At the same time, in the state where the user releases the handle, the angle adjusting pin 61 presses a plate surface of the pivot plate 86 so that the angle adjusting pin 61 can be engaged easily with the adjusting pin receiving section 59a at a predetermined pivot angle. Accordingly, the user may operate more conveniently the tilting hinge 130 to pivot.

As illustrated in FIG. 3, the angle adjusting elastic member stopper 65 connects with the angle adjusting pin 61 according to the size of the angle adjusting elastic member 63 to prevent the angle adjusting elastic member 63 from separating from the angle adjusting pin 61.

A pivot hinge hole 67 is formed on the second connecting bracket main body 53 according to a step formed on a pivot surface 85a and 85b, and thus the pivot hinge hole 67 engages with the pivot surface 85a and 85b of the pivot engaging section 83.

As illustrated in FIG. 1, the pivot hinge 70 has a pivot unit 80 combinable with the connecting bracket main body 50 to enable the tilting hinge 130 to pivot in the direction perpendicular to a plane of the connecting bracket main body 50, and a pivot hinge clamp 110 having one side combinable with the pivot unit 80 and the other side combinable with the tilting hinge 130. Accordingly, the pivot movement can be easily obtained by the tilting hinge 130.

As illustrated in FIG. 1 and FIG. 2, the pivot unit 80 is combinable with the connecting bracket main body 50 to enable the tilting hinge 130 to pivot in the direction perpendicular to a plane of the connecting bracket main body 50. Also, the pivot unit 80 has a pivot engaging section 83 having the pivot plate 86 on which the pivot surface 85a and 85b is formed, and a pivoting engaging section 90 provided at the second connecting bracket main body 53 and to engage with the pivot engaging section 83. The pivot surface 85a and 85b is in contact with the second connecting bracket main body 53 and can be slid along the second connecting bracket main body 53. Accordingly, the pivot hinge 70 can be easily pivoted by the pivot unit 80.

As illustrated in FIG. 3, the pivot engaging section 83 has the pivot plate 86 on which the pivot surface 85a and 85b is formed, and the pivot surface 85a and 85b contacts the second connecting bracket main body 53 and can be slid on the second connecting bracket main body 53. Also, the pivot engaging section 83 has a pivot guide section 87 that extends toward an inside of the connecting bracket main body 50 in the direction perpendicular to a plane of the pivot plate 86 and a pivot clamp receiving section 89 formed to be depressed from a plate surface corresponding to the pivot guide section 87 and combines with a pivot hinge clamp 110.

As illustrated in FIG. 3, the pivot surfaces 85a and 85b are received in the pivot hinge hole 67 of the second connecting bracket main body 53, and the pivot surfaces 85a and 85b are contacted with and slid on a plate surface of the second connecting bracket main body 53. By forming a step at an end portion of the pivot plate 86, a sliding contact area of the pivot surfaces 85a and 85b is increased, so that the stable pivot movement can be obtained.

A pivot guide section 87 has a cylindrical shape and extends from a plate surface of the pivot plate 86 toward an inside of the connecting bracket main body 50 and engages with the pivot guider 93. Accordingly, the pivot guide section 87 combines with the pivot guider 93 to guide a pivot movement of the tilting hinge 130, so that a relatively stable pivot movement can be obtained.

As illustrated in FIG. 3, the pivot clamp receiving section 89 is formed to be depressed from a plate surface of the pivot plate 86 so as to engage the pivot hinge clamp 110, which will be described later, with one side of the pivot plate 86.

The pivoting engaging section 90 is provided at the connecting bracket main body 50 and engages with the pivoting engaging section 83, so that a pivot movement of the tilting hinge 130 can be guided more stably. Also, the pivoting engaging section 90 has the pivot hinge hole 67 formed on the second connecting bracket main body 53 and engages with the pivot surface 85 of the pivot plate 86 and the pivot guider 93 protruding from the plate surface of the first connecting bracket main body 51 so as to guide the pivot guide section 87 and pivot the pivot hinge 70.

The pivot guider 93 is formed to protrude from a plate surface of the first connecting bracket main body 51 to guide the pivot guide section 87 and make the pivot hinge 70 pivot. Also, the pivot guider 93 is formed to have a cylindrical shape corresponding to the shape of the pivot guide section 87.

One side of the pivot hinge clamp 110 combines with the pivot unit 80 and the other side thereof couples with the tilting hinge 130. Also, the pivot hinge clamp 110 has a tilting hinge receiving section 117 formed thereon to receive the tilting hinge 130, a first tilting hinge fixing hole 113 to combine a fixing unit (not illustrated) provided to fix the tilting hinge 130 received in the tilting hinge receiving section 117 and a pivot clamp combining section 115 provided at a first side 110a thereof and combines with the second connecting bracket main body 53. Accordingly, the pivot hinge clamp 110 is disposed between the pivot unit 80 and a tilting hinge shaft 131 to transmit a tilt movement to the tilting hinge 130.

As illustrated in FIG. 3, a first tilting hinge fixing hole 113 has a structure to provide a securing means, such as a screw or bolt type structure which secures the tilting hinge shaft 131 after being received in the tilting hinge receiving section 117.

Accordingly, the pivot engaging section 83 and the pivot engaging section 90 can engage with each other, so that the tilting hinge 130 can be pivoted stably in the axial direction perpendicular to the swiveling axis direction of the swivel hinge 40.

The pivot clamp combining section 115 is provided at one end of the pivot hinge clamp 110, so that the pivot clamp combining section 115 can be engaged and combined with the pivot clamp receiving section 89 of the pivot plate 86.

As illustrated in FIG. 3, the tilting hinge receiving section 117 is formed through the pivot hinge clamp 110 to receive the tilting hinge shaft 131. Accordingly, the tilting hinge shaft 131, when received in the tilting hinge receiving section 117, can be secured by the securing means, such as the screw or bolt, as described above, to be screwed to the first tilting hinge fixing hole 113.

A side of the tilting hinge receiving section 117 is formed with a clamp slot 119 having a predetermined gap, and the tilting shaft 131 can be received easily through this clamp slot 119.

Referring back to FIG. 1 and FIG. 2, the supporting brackets 120a and 120b support the display device main body 15 and combine with the pivot hinge 70 of the connecting bracket 30 so that the display device main body 15 can be tilted on the connecting bracket 30 by the tilting hinge 130 (see FIG. 2). Also, the supporting brackets 120a and 120b have at least one supporting bracket main body 140a and 140b, respectively, which combines with the tilting hinge 130 and supports the display device main body 15. The supporting brackets 120a and 120*b* have an elastic unit 180*a* and 180*b*, respectively, which combines with a first support bracket 150 (150*a* and 150*b*, respectively) and supports elastically a second support bracket 160*a* and 160*b*, respectively, so as to support the weight of the display device main body 15 while the display device is tilted about the connecting bracket 30. Accordingly, the display device main body 15 can be tilted easily and in a secure manner.

As illustrated in FIG. 1 and FIG. 2, the tilting hinge 130 combines with the pivot hinge 70 of the connecting bracket 30 to enable the display device main body 15 to tilt around the connecting bracket 30. Also, the tilting hinge 130 has the tilting hinge shaft 131 that combines with the pivot hinge 70 to act as an axis X ("X" axial direction illustrated in FIG. 1 and FIG. 2) of tilt movement of the display device main body 15, and a first tilting hinge shaft hole 151 provided at the supporting bracket main body 140*a*, 140*b* and combinable with the tilting hinge shaft 131. Accordingly, the display device main body 15 tilts within a predetermined range of angle, so that the user can adjust the viewing angle of the display device.

Figure 4:
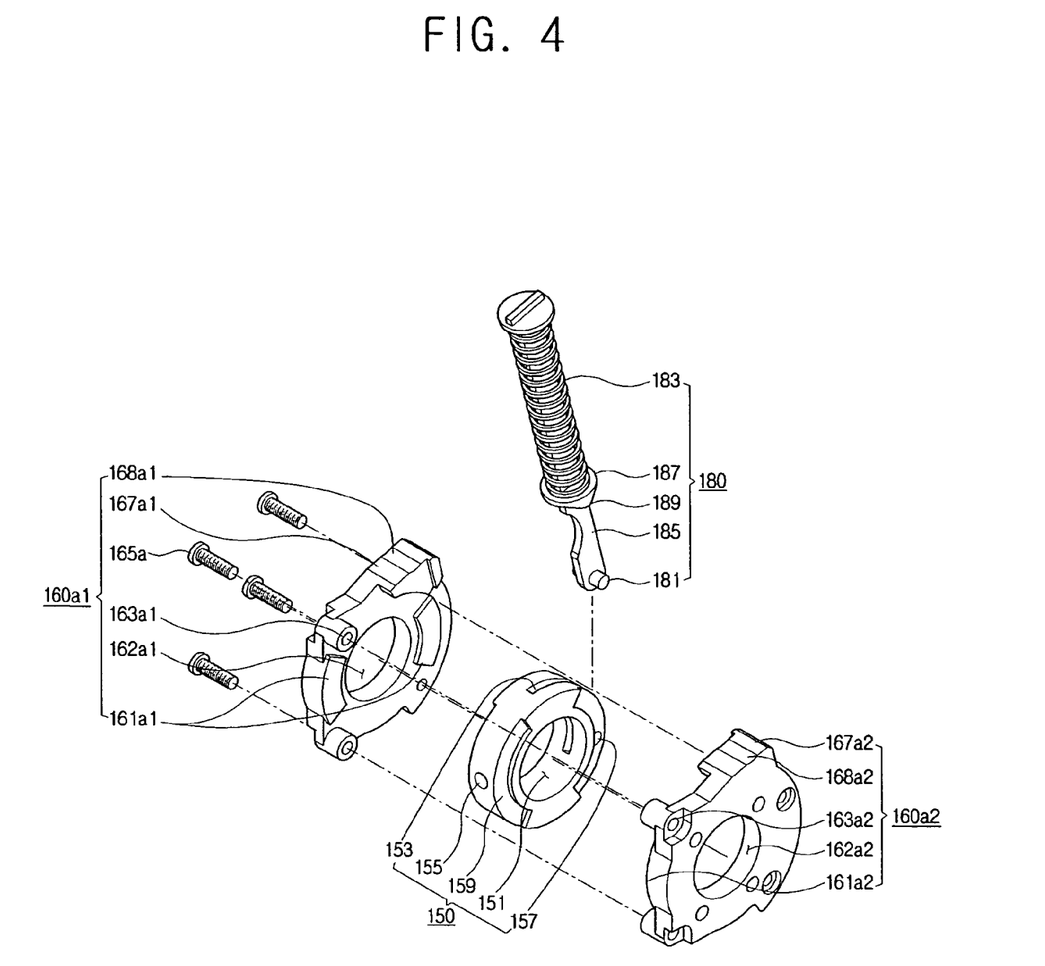
FIG. 4 is an exploded perspective view of a supporting bracket.

FIG. 4 illustrates an example of the assembly of the supporting bracket main body 140*a* together with and elastic unit 180 to be described in more detail below. It is to be noted that the supporting bracket main body 140*b* comprises a similar configuration as the supporting bracket main body 140*a*, and therefore will not be illustrated or discussed in detail.

As illustrated in FIG. 2 and FIG. 4, the supporting bracket main bodies 140*a* and 140*b* are each provided to combine with the tilting hinge 130 to support the display device main body 15. Also, each supporting bracket main body 140*a* and 140*b* has a main body fixing slot 173*a*, 173*b*, respectively, to support the display device main body 15. The main body fixing slot slots 173*a* and 173*b* are each formed such that a sectional surface area of its upper portion is larger than that of its lower portion. Each supporting bracket main body 140*a* and 140*b* includes the first supporting bracket 150 formed to receive the tilting hinge 130 in a center region thereof, the respective second supporting bracket 160*a* and 160*b* placed at each side of the first supporting bracket 150 to combine with each other (160*a*1 and 160*a*2 being placed at each side of the supporting bracket 150 for 140*a*, as illustrated in FIG. 4), and the respective supporting bracket housing 141*a* (or 141*b* used with 140*b*) to receive the first and second supporting brackets 150 and 160*a*1 and 160*a*2 (160*b*1 and 160*b*2 used with the respective supporting bracket housing 141*b* (not illustrated)). Accordingly, the supporting bracket main body 140*a*, 140*b* combines with the tilting hinge 130 and easily tilts so that the user can adjust the viewing angle of the display device 15.

As illustrated in FIG. 1 and FIG. 2, each supporting bracket housing 141*a*, 141*b* receives the first supporting bracket 150 and the pair of second supporting brackets 160*a*1, 160*a*2 (or 160*b*1, 160*b*2), which together provide a secure support for the display device 15. Each supporting bracket housing 141*a*, 141*b* is formed to have a plate shape and can be bent or welded. Each supporting bracket housing 141*a*, 141*b* has a respective supporting bracket receiving section 143*a*, 143*b* formed therethrough to receive the respective supporting bracket main body 140*a*, 140*b* and the respective elastic unit 180.

As illustrated in FIG. 2, each supporting bracket receiving section 143*a*, 143*b* is formed such that the first supporting bracket 150 and the respective second supporting bracket 160*a*, 160*b* can be received in an inside of the respective supporting bracket housing 141*a*, 141*b*. Also, each supporting bracket receiving section 143*a*, 143*b* can be covered with a predetermined cover, which can be attached to and detached from the supporting bracket receiving section 143*a*, 143*b*.

As illustrated in FIG. 2 and FIG. 4, the first supporting bracket 150 is formed such that the tilting hinge 130 is received in the center portion thereof. The supporting bracket 150 has a first tilting hinge shaft hole 151 to combine the first tilting hinge shaft 131. The first supporting bracket 150 has a first tilting hinge restriction slot 153 formed to receive an elastic member main body 185 of the elastic unit 180, so that a tilt movement of the elastic member main body 185 can be restricted within a predetermined range of angle. Also, the first supporting bracket 150 has a second tilting hinge fixing hole 155 formed to fix the tilting hinge 130 in place. Also, the first supporting bracket 150 has a friction receiving section 159 formed therein (on each side thereof) to provide a predetermined range of angle, so that the second supporting bracket 160*a*1 and 160*a*1 (or 160*b*1 and 160*b*2 for supporting bracket 120*b*) can be in sliding contact with the friction receiving section 159. The range of angle of the friction receiving section 159 can be set to various angles in view of the desired tilting angle of the display device main body 15. Alternatively, the friction receiving section 159 can be formed on the second supporting bracket 160*a*1 and 160*a*2 (or 160*b*1 and 160*bs*) instead of being formed on the first supporting bracket 150. The supporting bracket main body 140*a*, 140*b* combines with a side surface of the respective supporting bracket housing 141*a*, 141*b* by a securing means, such as a bolt.

As illustrated in FIG. 4, the second supporting brackets 160*a* (including 160*a*1 and 160*a*2), between which the first supporting bracket 150 is disposed (a similar explanation and assembly applies to 160*b*, which would include 160*b*1 and 160*b*2 (not illustrated)), combine with each other, so that the two second supporting brackets 160*a* (160*a*1 and 160*a*2) are in sliding contact with the first supporting bracket 150 to generate a friction force during the tilt movement. Also, friction protrusions 161*a* (161*a*1 and 161*a*2) are formed to protrude from the respective second supporting brackets 160*a*1 and 160*a*2, and the friction protrusions 161*a* and 161*a*2 engage with the respective friction receiving section 159 of the first supporting bracket 150 within a predetermined range of angle. The range of angle of the friction protrusion sections 161*a*1 and 161*a*2 can be set to various angles within a range which is less than that of the friction receiving section 159 in view of the tilt angle of the display device main body 15. Alternatively, the friction protrusion sections 161*a*1 and 161*a*2 can be formed on the first supporting bracket 150. The second supporting brackets 160*a*1 and 160*a*2 have respective second tilting hinge shaft holes 162*a*1 and 162*a*2 formed at mid sections thereof to receive the tilting hinge shaft 131. Also, the second supporting brackets 161*a*1 and 161*a*2 have respective second supporting bracket combining holes 163*a*1 and 163*a*2 through which the second supporting bracket combining member 165*a* is combined. The second supporting bracket combining member 165*a* combines the second supporting brackets 160*a*1 and 160*a*2 together with the first supporting bracket 150 placed therebetween. As pointed out above, a similar assembly applies regarding the second supporting bracket 160*b* (including 160*b*1 and 160*b*2 (not illustrated)). Accordingly, the second supporting brackets 160*a*1 and 160*a*2 combine with each other with a predetermined combining force, so that a predetermined friction force can be generated among the friction receiving section 159 and the second supporting brackets 160*a*1 and 160*a*2 when the second supporting brackets 160*a*1 and 160*a*2 are pivoted against the first supporting bracket 150. Also, the inclined sections 163*a*1 and 163*a*2 are formed on the respective second supporting brackets 160*a*1 and 160*a*2 so that a distance between an axis of pivot movement of the tilting hinge 130 and each inclined section can be increased gradually, and thus an elastic member 183 becomes compressed or expanded when the second supporting brackets 160a1 and 160a2 (and 160b1 and 160b2 (not illustrated)) are rotated against the first supporting bracket 150. Accordingly, an elastic force of the elastic member 183 of the elastic unit 180 by which the second supporting brackets 160a1 and 160a2 are elastically supported can be increased or decreased when the second supporting brackets 160a1 and 160a2 are tilted. Accordingly, a pressing force applied to tilt the display device main body 15 can be increased or decreased, so that it is possible to tilt the large sized display device main body 15 with a relatively small force. The second supporting brackets 160a1 and 160a2 have respective elastic member stopper receiving sections 168a1 and 168a2 which engage with an elastic member stopper protrusion 189 of an elastic member stopper 187. Also, the support bracket main body 140a, 140b combines with the respective supporting bracket housing 141a, 141b by a combining means, such as a screw, etc.

Accordingly, the first supporting bracket 150 and the second supporting bracket housing 160a1 and 160a2 are in a sliding contact with each other via a sliding contact between the friction receiving section 159 and the friction protrusion 161a1 and 161a2, so that the supporting bracket 150 for each of the second supporting bracket housing 160a (160a1 and 160a2) and 160b (160b1 and 160b2) becomes tilted and a friction force is generated therebetween. By adjusting the combining force of the second supporting bracket combining member 165a (or 165b (not illustrated)), the friction force can be increased or decreased. Accordingly, in a case where the second supporting bracket 160a is tilted against the first supporting bracket 150, the combining force can be adjusted easily, so that the structure can be simplified and the apparatus is convenient to use.

As illustrated in FIG. 1 and FIG. 2, a safety pin 169a, 169b combines with a safety pin hole 171a, 171b formed on the respective supporting bracket housing 141a, 141b to prevent the display device main body 15 from separating from the main body fixing slots 173a, 173b while the tilting hinge 130 is tilted in a state in which the tilting hinge 130 is combined with the main body fixing slot 173a, 173b. Accordingly, in the case of a tilt movement, it is possible to prevent the display device main body 15 from separating from the tilting hinge 130.

As illustrated in FIG. 1, FIG. 2 and FIG. 5, a sectional surface area of an upper portion of the main body fixing slot 173a, 173b is larger than that of a lower portion, so that the main body fixing slot 173a, 173b can be combined with the main body fixing protrusion 17 of the display device main body 15 (see FIG. 5). Accordingly, the display device main body 15 can be inserted and supported in the main body fixing slot 173a, 173b.

As illustrated in FIG. 4, the elastic unit 180 has the elastic member 183 having an elasticity, the elastic member main body 185 combined with the elastic member 183, an elastic member rotating shaft 181 formed to protrude from a palate surface of the elastic member main body 185 and combinable with the first supporting bracket 150 to enable the elastic member main body 185 to rotate around the first supporting bracket 150, and the elastic member stopper 187 provided between the elastic member rotating shaft 181 and the elastic member 183 and combined with the elastic member main body 185 to support the elastic member 183.

The elastic member rotating shaft 181 is formed to protrude from the palate surface of the elastic member main body 185 and to combine with the first supporting bracket 150 to enable the elastic member main body 185 to rotate against the first supporting bracket 150.

The elastic member 183 has an elasticity and can be comprised of a conventional spring. However, various other devices, such as an air cylinder, etc., can be used as the elastic member 183.

The elastic member main body 185 is combined with the elastic member 183 and the elastic member stopper 187. Also, the elastic member main body 185 has a protrusion (not illustrated) having an outer diameter larger than that of the elastic member 183 and provided at an end portion thereof to prevent the elastic member 183 from separating therefrom. However, although a flat plate member is provided as the elastic member main body 185, the shape of the elastic member main body 185 can be changed into various shapes, such as a circular plate.

The elastic member stopper 187 is disposed between the elastic member rotating shaft 181 and the elastic member 183 and combined with the elastic member main body 185 to support the elastic member 183. Also, the elastic member stopper 187 has the elastic member stopper protrusion 189 formed to protrude from an end portion and to have an inclined portion.

Figure 6:
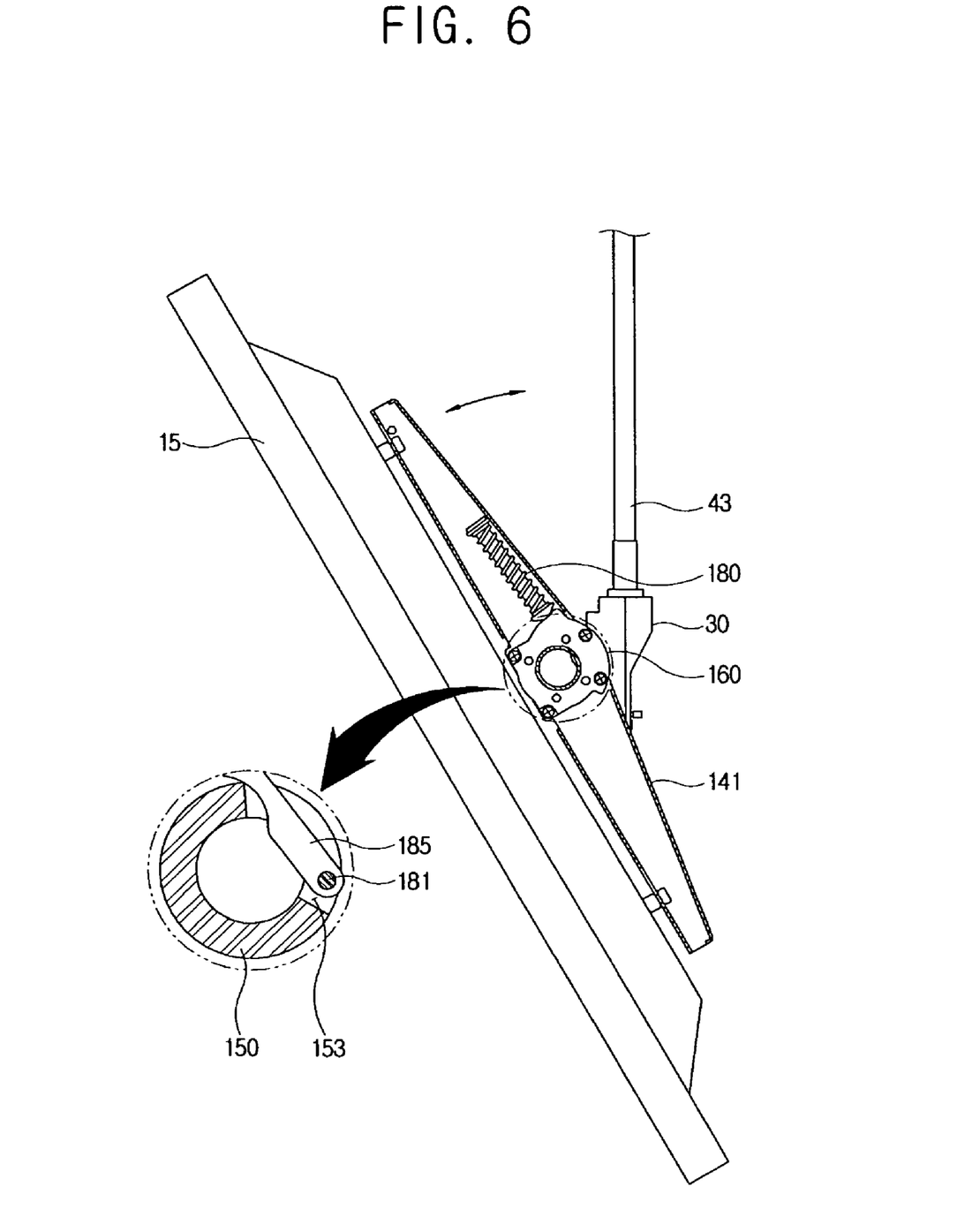

A tilting process is described with reference to FIG. 4, FIG. 5 and FIG. 6 as follows. Firstly, FIG. 5 illustrates a normal state in which the display device main body 15 is not tilted, but maintains in the vertical state. Next, in order to tilt the display device main body 15 which is in the vertical state with the tilting hinge 130 by a predetermined angle, the user must press the display device main body 15 to overcome a friction force generated by a contact between the friction receiving section 159 of the first supporting bracket 150 and the friction protrusion 161 of the second supporting bracket 160, the friction force caused by a combining force of the second supporting bracket combining member 165. Thus, the display device main body 15 becomes tilted. At this time, as illustrated in FIG. 6, the elastic member main body 185 combined with the tilt angle restriction slot 153 of the first supporting bracket 150 is contacted with the tilt angle restriction slot 153, so that the second supporting bracket 160 (160 or 160b) is not tilted any more, and consequently, the tilt angle is restricted. Also, the elastic member stopper protrusion 189 is engaged with the elastic member stopper receiving section 168 of the inclined section 167, so that the elastic member stopper protrusion 189 is rotated. Accordingly, the elastic member 183 is contracted and presses the second supporting bracket 160. The pressing force can easily overcome the weight of the display device main body 15, so that the display device main body 15, regardless of the size and weight, can be tilted easily. However, the pressing force must be selected to be less than the friction force generated by the friction receiving section 159 and the friction protrusion 161. Thus, the elastic member 183 should be selected to obtain the elastic force which can meet the above condition.

The embodiment described above is applied to an LCD television as an example. However, the present general inventive concept is applicable to any electronic equipment, such as a projector forming an image on a screen.

An operating process of the apparatus to support the display device having the above structure according to the present general inventive concept is described with reference to FIG. 1, FIG. 2 and FIG. 3 as follows.

Firstly, a process to assemble the apparatus to support the display device is described with reference to FIG. 2 and FIG. 3. The swivel hinge 40 and the pivot hinge 70 are combined with the first connecting bracket main body 51 and the second connecting bracket main body 53. Then, the tilting hinge shaft 131 is inserted into the first tilting hinge fixing hole 151 of the pivot hinge clamp 110 and the tilting hinge shaft 131 is fixed to the pivot hinge clamp 110 using the first tilting hinge fixing hole 113. The first and second supporting brackets 150 and 160a, 160b, to which the elastic unit 180 is already assembled are combined with both end portions of the tilting hinge shaft 131, and the second supporting bracket 160a, 160b is then combined with the respective supporting bracket housing 141a, 141b. Then, the first supporting bracket 150 is fixed to the tilting hinge shaft 131 by tightening a screw type securing means in the second tilting hinge fixing hole 155. Then, the ceiling bracket 20 is fixed to the ceiling. Also, each main body fixing protrusion 17 of the display device main body 15 is inserted into the respective main body fixing slot 173a, 173b, so that the display device main body 15 is supported. In order to ensure safety, the respective safety pin 169a, 169b is coupled with the respective safety pin hole 171a, 171b.

Next, an operating process of the present general inventive concept is described with reference to FIGS. 1, 5 and 6 as follows. The display device main body 15 can be swiveled by 360 degrees in the direction Z (axial direction "Z" in FIG. 1) perpendicular to the plane face of the ceiling bracket 20. At this time, a cable through which an electricity power is supplied to the display device main body 15 is provided flexibly to allow for a swivel movement of the display device main body 15. Also, the display device main body 15 can be pivoted about the direction Y (axial direction "Y" in FIG. 1) perpendicular to the axis of the swivel movement. At this time, the pivot movement is obtained conveniently by the pivot angle restriction unit 57. That is, the pivot angle can be restricted within a predetermined range and it is relatively easy to maintain and release the pivot angle restriction state. Also, as a process of tilting the display device main body 15 around the pivot hinge 70 is already described with reference to FIGS. 5 and 6, the description thereon is omitted here.

Accordingly, according to the present general inventive concept, a display device main body can be swiveled, pivoted and tilted so that the viewing angle can be adjusted conveniently. Also, in the course of tilting, it is possible to support elastically the weight of the display device main body, so that a large sized display device main body can be moved with a relatively small force. Further, since first and second supporting brackets are received in supporting bracket housing, an outer appearance of the display and support apparatus can be improved.

In the apparatus to support the display device according to the present general inventive concept as described above, a display device main body supported to a ceiling can be swiveled, pivoted and tilted easily and the display device main body can be tilted by relatively small force. Also, according to the apparatus to support the display device of the present general inventive concept, a swivel, pivot and tilt movement and an adjustment of a viewing angle for the display device main body can be performed easily and stably with relatively small force.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An apparatus to support a display device main body to a ceiling, comprising:
    a ceiling bracket to connect with the ceiling;
    a connecting bracket comprising a swivel hinge coupled with the ceiling bracket to enable the connecting bracket to swivel about an axis perpendicular to a plane of the ceiling bracket and a pivot hinge to pivot about an axis perpendicular to an axis of the swivel hinge; and
    a supporting bracket to elastically support the display device main body to overcome a weight of the display device main body, the supporting bracket comprising a tilting hinge combined tiltably with the connecting bracket.

2. The apparatus according to claim 1, wherein the connecting bracket further comprises:
    a connecting bracket main body having a first connecting bracket main body and a second connecting bracket main body to face each other and together to couple with the swivel hinge and the pivot hinge, and
    the supporting bracket further comprises:
    at least one supporting bracket main body coupled with a tilting hinge of the connecting bracket to support the display device main body.

3. The apparatus according to claim 2, wherein the swivel hinge comprises:
    a swivel hinge shaft having a first side to combine with the ceiling bracket and a second side to combine with the connecting bracket main body; and
    the supporting bracket main body comprises:
    a swivel hinge shaft hole which provided therethrough to be combined with the swivel hinge shaft.

4. The apparatus according to claim 3, wherein the swivel hinge further comprises:
    a swivel hinge engaging section formed to protrude from one of the swivel hinge shaft and the swivel hinge shaft hole; and
    a swivel hinge engaged section formed on the other of the swivel hinge shaft and the swivel hinge shaft hole to be engaged with the swivel hinge engaging section.

5. The apparatus according to claim 2, wherein the connecting bracket main body has a pivot angle restriction unit provided to restrict a pivot movement of the pivot hinge within a predetermined range of angle when the pivot hinge is pivoted.

6. The apparatus according to claim 5, wherein the pivot angle restriction unit comprises an angle adjusting pin receiving section formed to be depressed from a plate surface of the pivot hinge, and an angle adjusting pin combined with the connecting bracket main body and engaged with the angle adjusting pin receiving section.

7. The apparatus according to claim 6, wherein the pivot angle restriction unit further comprises:
    an angle adjusting elastic member combined with the angle adjusting pin to elastically press the angle adjusting pin toward the angle adjusting pin receiving section; and
    an angle adjusting elastic member stopper combined with the angle adjusting pin to prevent the angle adjusting elastic member from separating from the angle adjusting pin.

8. The apparatus according to claim 2, wherein the pivot hinge comprises:
    a pivot unit combined with the connecting bracket main body to enable the tilting hinge to pivot about an axis perpendicular to an axis in which the pivot hinge pivots; and
    a pivot hinge clamp combined with the pivot unit through a first side thereof and combined with the tilting hinge through a second side thereof.

9. The according to claim 8, wherein the pivot unit comprises:
    a pivot engaging section having a pivot plate on which a pivot surface is formed, the pivot surface being in sliding contact with the second connecting bracket main body; and
    a pivot engaged section provided on the connecting bracket main body and engagable with the pivot engaging section.

10. The apparatus according to claim 9, wherein the pivot engaging section comprises:
a pivot guider having a cylindrical shape and extending from a plate surface of the pivot plate toward an inside of the connecting bracket main body; and
a pivot clamp receiving section combinable with the pivot clamp and formed to be depressed from a plate surface which is disposed opposite to the pivot guider.

11. The apparatus according to claim 9, wherein the pivot engaged section comprises:
a pivot hinge hole formed through the second connecting bracket main body and engagable with a pivot surface of the pivot plate; and
a pivot guider formed to protrude from a plate surface of the first connecting bracket main body, the pivot guider to guide the pivot guide section to allow the pivot hinge to pivot.

12. The apparatus according to claim 8, wherein the pivot clamp comprises:
a tilting hinge receiving section formed to receive the tilting hinge;
a tilting hinge fixing hole combined with a fixing means to fix the tilting hinge received in the tilting hinge receiving section; and
a pivot clamp combining section provided at the first side of the pivot clamp and combinable with the second connecting bracket main body.

13. The apparatus according to claim 2, wherein the tilting hinge comprises:
a tilting hinge shaft combinable with the pivot hinge to act as an axis of a tilt movement of the display device main body; and
a first tilt hinge shaft hole formed through the supporting bracket main body and combinable with the tilting hinge shaft.

14. The apparatus according to claim 2, wherein the supporting bracket main body comprises:
a main body fixing slot formed thereon to support the display device main body, the main body fixing slot comprising a lower section and an upper section having a sectional surface area which is larger than that of the lower section.

15. The apparatus according to claim 2, wherein the supporting bracket main body comprises:
a first supporting bracket formed to receive the tilting hinge in a mid portion thereof,
a second supporting bracket disposed at both sides of the first supporting bracket and combined with each other; and
a supporting bracket housing to receive the first supporting bracket and the second supporting brackets therein, the first and second supporting brackets being combined with each other in the supporting bracket housing.

16. The apparatus according to claim 15, wherein
a friction receiving section is formed in one of the first supporting bracket and the second supporting brackets; and
a friction protrusion is formed in the other one of the first supporting bracket and the second supporting brackets and engages slidably with the friction receiving section.

17. The apparatus according to claim 15, further comprising:
an elastic unit combined with the first supporting bracket to support elastically the second supporting brackets to support the weight of the display device main body when the support bracket is tilted against the connecting bracket,
wherein the elastic unit comprises:
an elastic member having elasticity;
an elastic member main body combined with the elastic member;
an elastic member rotating shaft formed to protrude from a plate surface of the elastic member main body and combined with the first support bracket to enable the elastic member main body to rotate around the first supporting bracket; and
an elastic member stopper provided between the elastic member rotating shaft and the elastic member and combined with the elastic member main body to support the elastic member.

18. The apparatus according to claim 17, wherein the second supporting brackets comprise:
an inclined section formed thereon, a distance between an axis of the pivot movement of the tilting hinge and the inclined section being increased gradually such that the elastic member is compressed and expanded when each second supporting bracket is rotated around the first supporting bracket.

19. The apparatus according to claim 17, wherein the first supporting bracket comprises a tilt angle restriction slot formed thereon to receive the elastic member main body to restrict a movement of the elastic member main body within a predetermined range of angle.

20. The apparatus according to claim 19, wherein the angle restriction slot comprises an elastic member rotating shaft hole combined with the elastic member rotating shaft.

21. The apparatus according to claim 15, wherein the first supporting bracket comprises a tilting hinge fixing hole formed to fix the tilting hinge.

22. The apparatus according to claim 15, wherein the second supporting brackets comprise:
a second supporting bracket combining hole formed to combine the second supporting brackets with each other; and
a second supporting bracket combining member combinable with the second supporting bracket combining hole.

23. The apparatus according to claim 15, further comprising:
a supporting bracket receiving section formed to receive the first and second supporting brackets in the supporting bracket housing therethrough.

24. The apparatus according to claim 18 further comprising:
an elastic member stopper protrusion formed to protrude from one of the elastic member stopper and the inclined section to prevent the elastic member stopper from separating from the inclined section;
and an elastic member stopper receiving section formed on the other one of the elastic member stopper and the inclined section and engaged with the elastic member stopper protrusion.

25. The apparatus according to claim 14, further comprising:
a safety pin hole formed on the supporting bracket main body to prevent the display device main body from separating from the main body fixing slot when the tilting hinge is pivoted in a state that the tilting hinge is combined with the main body fixing slot.

26. An apparatus to support a display device to a ceiling, comprising:
a ceiling bracket connectable to the ceiling;
a swivel hinge connected at one end to a center portion of the ceiling bracket;

a connecting bracket comprising:
- a swivel hinge engaging section at one side thereof to engage with the other end of the swivel hinge to swivel about an axis of the swivel hinge, and
- a pivot hinge at another side thereof to pivot about an axis extending perpendicular to the axis of the swivel hinge;
- a tilting hinge shaft extending through the pivot hinge to pivot together with the pivot hinge about an axis perpendicular to the swivel hinge; and
- a tilting hinge tiltably disposed at each end of the tilting hinge shaft to engage with a respective end of the display device to elastically tilt the display device about an axis of the tilt hinge shaft.

27. The apparatus according to claim 26, wherein the connecting bracket further comprises:
- a first connecting bracket main body to engage with a portion of the swivel hinge shaft and comprising a pivoting engaging section extending therethrough to slidably support the pivot hinge; and
- a second connecting bracket main body to face the first connecting bracket main body and to be secured thereto and to engage with a remaining portion of the swivel hinge shaft, the second connecting bracket main body comprising a pivot guide to extend inward through the connecting bracket toward the first connecting bracket main body to support an inner portion of the pivot hinge in the pivot hinge engaging section.

28. The apparatus of claim 27, wherein the pivot hinge comprises:
- a pivot hinge plate to be secured between the pivoting engaging section and the pivot guide; and
- a pivot hinge clamp in which the tilting hinge shaft extends therethrough and to engage with an outer portion of the pivot hinge plate.

29. The apparatus of claim 28, wherein each tilting hinge comprises:
- a first supporting bracket to engage with the respective end of the tilting hinge shaft; and
- a pair of second supporting brackets, the supporting brackets disposed on opposite sides of the first supporting bracket and connected to each other such that the pair of second supporting brackets frictional rotate with respect to the first supporting bracket; and
- a supporting bracket housing to connect with the pair of second supporting brackets and to connect with the display unit to proving a frictional movement of the display device with respect to the tilting hinge shaft.

30. The apparatus of claim 29, wherein each tilting hinge further comprises:
- an elastic unit extending from the first supporting bracket to restrict the movement of the first supporting bracket with respect to the supporting bracket housing.

31. The apparatus of claim 29, wherein first supporting bracket has a friction receiving section formed therein to receive a screw member which extends therethrough to engage with the tilting hinge shaft to fix the first supporting bracket with respect to the tilting hinge shaft.

32. The apparatus of claim 29, wherein one of the first supporting bracket and the second support brackets comprise a friction receiving section and the other one of the first supporting bracket and the second support brackets comprise at least one friction protrusion such that the friction protrusion section engages within the friction receiving section to frictionally slide therein.

33. The apparatus of claim 32, wherein the friction receiving section is formed to a predetermined length to limit the sliding contact of the first supporting bracket and the second support brackets.

34. An apparatus to support a display device to a ceiling, comprising:
- a ceiling bracket connectable to the ceiling;
- a first swivel unit extending from the ceiling bracket and comprising:
  - a first rotation member rotatable about a first rotation axis extending away from the ceiling; and
  - a second rotation member rotatable about an axis perpendicular to the first rotation axis; and
- a display unit fixing member to elastically fix the display unit to the second rotation axis to rotate the display unit about the first rotation axis and the second rotation axis as well as a third rotation axis perpendicular to the first and second rotation axes.

35. The apparatus of claim 34, wherein the display unit fixing member comprises:
- a shaft extending through the second rotation member; and
- a support bracket disposed at each end of the shaft at a middle portion thereof to frictionally rotate with respect to the shaft and connectable to the display unit such that the display unit frictionally rotates with respect to the shaft about the third rotation axis perpendicular to the axes in which the first and second rotating members rotate.

* * * * *